United States Patent
Beser

(10) Patent No.: US 9,094,992 B2
(45) Date of Patent: *Jul. 28, 2015

(54) TDD SECTOR CONTROL SYSTEMS AND METHODS

(71) Applicant: Telsima Corporation, Santa Clara, CA (US)

(72) Inventor: Nurettin Burcak Beser, Sunnyvale, CA (US)

(73) Assignee: Telsima Corporation, Santa Clara, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/863,317

(22) Filed: Apr. 15, 2013

(65) Prior Publication Data

US 2013/0229956 A1  Sep. 5, 2013

Related U.S. Application Data

(63) Continuation of application No. 11/737,745, filed on Apr. 19, 2007, now Pat. No. 8,423,034.

(60) Provisional application No. 60/745,173, filed on Apr. 19, 2006.

(51) Int. Cl.
*H04W 72/12* (2009.01)
*H04W 16/14* (2009.01)
*H04W 16/12* (2009.01)

(52) U.S. Cl.
CPC .............. *H04W 72/12* (2013.01); *H04W 16/14* (2013.01); *H04W 16/12* (2013.01)

(58) Field of Classification Search
USPC .......................................... 370/335; 455/450
See application file for complete search history.

(56) References Cited

U.S. PATENT DOCUMENTS

| 5,732,073 | A | 3/1998 | Kusaki et al. |
| 5,999,818 | A | 12/1999 | Gilbert et al. |
| 6,556,830 | B1 | 4/2003 | Lenzo |
| 8,423,034 | B2 * | 4/2013 | Beser ............................ 455/450 |
| 2001/0055297 | A1 | 12/2001 | Benveniste |
| 2003/0125025 | A1 | 7/2003 | Lim |
| 2003/0174664 | A1 | 9/2003 | Benveniste |
| 2004/0001429 | A1 | 1/2004 | Ma et al. |
| 2004/0066768 | A1 | 4/2004 | Yeh et al. |
| 2007/0081489 | A1 | 4/2007 | Anderson et al. |

OTHER PUBLICATIONS

European Patent Application No. 07755864.1, Search Report mailed Feb. 13, 2013.
International Search Report and Written Opinion issued May 6, 2008 in International Application No. PCT/US07/09758.

* cited by examiner

*Primary Examiner* — Amancio Gonzalez
(74) *Attorney, Agent, or Firm* — Sheppard, Mullin, Richter & Hampton LLP

(57) ABSTRACT

Systems and methods are described for controlling transmission in a wireless network. In these systems and methods a sequence of time zones may be provided whereby each time zone can be allocated to one of a plurality of base stations. For each base station dead times in the sequence are identified in which the base station is prohibited from transmitting and receiving. The dead times for the base station may correspond to transmit or receive zones of at least one other base station. The dead times can be interleaved with transmit zones and receive zones assigned to the base station. Configuration and duration of the dead times may be selected to reduce interference between base stations. Base stations can support different wireless transmission systems including OFDM and OFDMA systems and others.

19 Claims, 5 Drawing Sheets

Normal Base Station Framing

Base Station Framing with dead time (1,3,3) Frequency Reuse
(100)

(1,1,3) Frequency Reuse
(102)

TDD SECTOR CONTROL SYSTEMS AND METHODS

CROSS-REFERENCE TO RELATED APPLICATIONS

This application is a continuation of U.S. patent application Ser. No. 11/737,745, filed Apr. 19, 2007 and entitled "TDD Sector Control Systems and Methods," now U.S. Pat. No. 8,423,034, which claims priority to U.S. Provisional Patent Application Ser. No. 60/745,173, filed Apr. 19, 2006 and entitled "TDD Sector Control," which applications are incorporated by reference herein.

BACKGROUND OF THE INVENTION

1. Field of the Invention

The application relates to communications systems and more particularly to wireless communications networks.

2. Description of Related Art

In current wireless networks, almost all multiple-cell, multiple-sector systems use some form of the well known frequency division duplex ("FDD") mechanisms to run multiple radios in a physical location. The use of FDD helps to reduce the interference of the radio transmitters. Wireless Broadband Access ("WBA") based systems have been designed to have operational characteristics that are indistinguishable from Cable or DSL methods of broadband access from the viewpoint of the customer. However, wireless systems are subject to substantial signal fading and interference.

Today almost all of the multiple-cell/multiple-sector systems use the well-known frequency division duplex ("FDD") mechanisms to run multiple radios in a physical location. The use of FDD helps to reduce the interference between the radio transmitters. Two main usage methods for 3 sector applications are provided in FIG. 1. The first case 100 depicts an RF frequency usage pattern whereby each cluster comprises one base station site. Each base station site has three sectors in which each of the three sectors is assigned a unique RF channel. In the second case 102, an RF frequency usage pattern is depicted in which each cluster comprises one base station site and each base station site has three sectors with all sectors being assigned the same RF channel. In this case the FDD separation of radio transmitter is not being used. Interference in the first case 100 between the sectors using the same frequency is substantially less than in the second case. Therefore, the first case 100 configuration is currently preferred in most installations.

Inter-subscriber station interference can result in loss of bandwidth, signal corruption, signal disruption and increased power requirements in wireless networks. Another factor in conventional WBA systems is the substantial cost of the overall system and the cost and impact of upgrading as user demands change. The general method used today is to use a separate frequency for the upgrades. One example to this upgrade is the case of IEEE 802.16. There are two versions of IEEE 802.16 widely adopted today, one version being OFDM based, and the other OFDMA based. In deployments today if OFDM is deployed the service providers must need to allocate a new frequency to deploy OFDMA or vice versa. In the current economic situation the frequency is as valuable— sometimes more valuable than the WBA systems deployed— and this is not an attractive solution. When compounded with the fact that most of the service providers are not even sure which services they offer will be accepted by the users the case of allocating/buying a new frequency is not an attractive option.

BRIEF SUMMARY OF THE INVENTION

Certain embodiments of the invention enable the provision of enhanced service in wireless networks. Certain embodiments of the invention provide methods for controlling transmission in a wireless network. These methods can comprise providing a sequence of time zones, each time zone being allocated to one of a plurality of base stations, and for each of the plurality of base stations, selecting dead times in the sequence during which the each base station is prohibited from transmitting and receiving. The dead times for the each base station can correspond to transmit or receive zones of at least one other base station. Certain of the dead times can be interleaved with transmit zones assigned to the each base station and certain of the dead times are interleaved with receive zones assigned to the each base station. In certain embodiments, dead times may be selected to reduce interference between the each base station and the at least one other base station.

In certain embodiments, base stations can support different wireless transmission systems. The different wireless transmission systems include, for example, OFDM and OFDMA systems. Dead times may be configured to overlap an entire transmit time zone one or more other base stations and each dead time may overlap an entire receive time zone of the at least one other base station.

In certain embodiments a wireless transmission system is employed that comprises a plurality of wireless base stations, each base station in wireless communication with at least one subscriber station, and a sequencer configured to provide a sequence of time zones. In certain embodiments, each time zone is assigned to at least one of the base stations. In certain embodiments, the time zones include dead times during which communication between at least one base station and its corresponding subscriber stations is suppressed. In certain embodiments, the dead times are assigned to a selected base station to reduce interference between the selected base station and at least one other base station. In certain embodiments, the plurality of base stations may include base stations that support different wireless transmission systems including, for example, OFDM and OFDMA systems. In certain embodiments, a dead time is assigned to a selected base station when one or more other base stations are transmitting.

BRIEF DESCRIPTION OF THE DRAWINGS

Aspects and features of this application will become apparent to those ordinarily skilled in the art from the following detailed description of certain embodiments in conjunction with the accompanying drawings, wherein.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration. Throughout this document an example embodying a 3 sector cell is used, but all of the discussions can easily be adopted for other configurations having any number of sectors.

Figure 1:
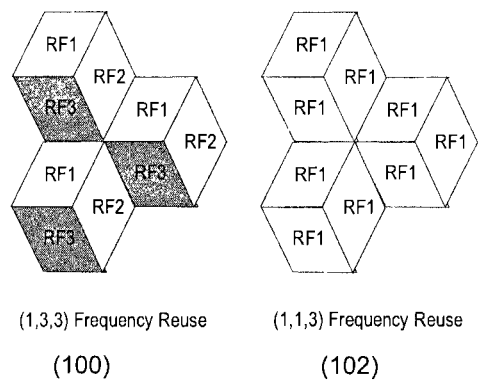
FIG. 1 depicts RF usage in a three sector wireless network.

Certain embodiments of the invention employ time division duplex ("TDD") techniques to reduce the effects of interference between sectors. TDD can be employed to control timing of transmissions by base stations such that only one sector is driven by a base station at any given time. The use of TDD techniques can provide results whereby interference is substantially reduced to the level of the first case 100 illustrated in FIG. 1.

Furthermore, the available bandwidth for the second case 102 is three times greater than in the first case 100, allowing the performance of the second case 102 to match that of the first case 100. It will be appreciated that available power may remain the same in a single frequency TDD implementation resulting in lower power per hertz usage. However, in urban environments base stations are typically abundant and much closer to each other and power usage is largely irrelevant. Furthermore, sub-channelization can increase the per hertz transmission power, and where the lowest sub-channelization rates are not viable due to their low data bandwidth, unavailability of lower sub-channelization is a non-issue.

In certain embodiments, the use of TDD can improve the effective rate of bits transported per hertz of frequency. This advantage is obtained because traffic demand in sectors is typically unequal, and one sector may dominate other sectors. By employing TDD techniques, it is possible to engineer a scenario such that bandwidth is allocated and served to sectors as needed. Thus, a sector exhibiting greater bandwidth demand than other sectors can be allocated a greater proportion of available bandwidth by altering the division of time between sectors. As network deployment continues, bandwidth demand/take rate may change and TDD time divisions can be adjusted to accommodate changes in demand. Changes can be made dynamically and/or by configuration. For example, a base station may be reconfigured to accommodate prolonged changes in demand profiles of the various sectors based on parameters set during configuration that can include limitations based on time of day, limitations on rates of change, guaranteed levels of service and maximum/minimum settings.

Thus, providers would not be required to maintain predictions and projections of demand. Additionally, the use of TDD techniques can enable network reconfiguration without modification or augmentation of hardware. Another advantage of the TDD systems is that in line-of-sight ("LOS") and near-line-of-sight ("NrLOS") configurations, maximum burst rate can be significantly higher. In the example of 3 sectors/cell, maximum burst rate can be increased by a factor of three. Consequently, network providers can offer more attractive higher-margin burst capabilities to subscribers.

Figure 2A:
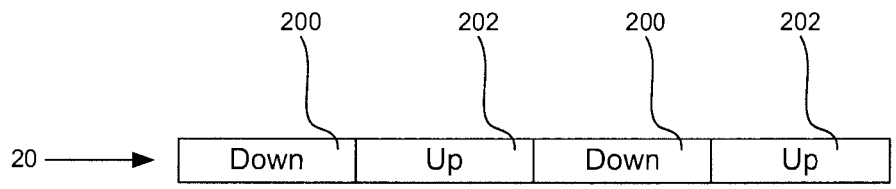
FIGS. 2a and 2b are simplified illustrations of zone timing in one embodiment.
Figure 2A:
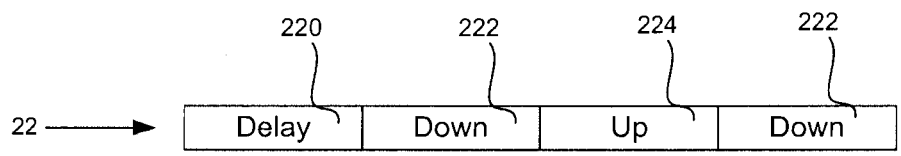

In a wireless transmission system all base-stations are synchronized in such a manner that they use the same time-zone as reference and transmit and receive using the time-reference. Referring now to FIG. 2a, in one example, a base-station may be configured to provide programmable delay measured in milliseconds. Thus, a base station frame 20 comprising down segments 200 and up segments 202 can be altered as shown generally at 22. The altered frame 22 comprises delay segments 220, down segments 222 and up segments 224.

Figure 2B:
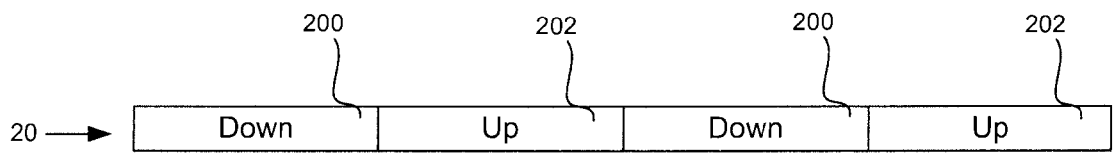
Figure 2B:
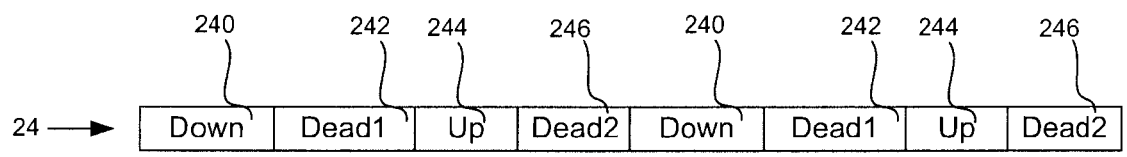

Referring now to FIG. 2b, in another example, a base-station may be configured to provide dead times in base station frames. A base station frame 20 comprising down segments 200 and up segments 202 can be altered as shown generally at 24. The altered frame 24 comprises dead segments 242 and 246 as well as down segments 240 and up segments 244. Typically, the base station does not transmit downstream traffic or schedule any upstream traffic during dead-time segments 242 and 246. In certain embodiments, the base station is prohibited from transmitting downstream traffic or scheduling/receiving any upstream traffic during dead-time segments 242 and 246. Dead times may be interleaved with down segments 240 and up segments 244 as necessary to obtain a desired or acceptable performance level including throughput and suppression of interference. Dead times may be assigned by a base station or centrally. In some embodiments a central server assigns dead times or initial dead time selections.

In certain embodiments, TDD techniques can be used in certain sectors and different technologies can be used in other sectors. Different technologies can operate at the same frequency/bandwidth as used in the TDD sectors. In one embodiment, unutilized time-zones can be configured by a centralized server for each frame. In another embodiment a combination of static and dynamic configuration may be implemented. For example, updates can be performed at predetermined or preconfigured intervals. Updates can also be made automatically based on demand and predetermined rules governing allocation of bandwidth.

In certain embodiments, the base stations may configure frames based on known configuration of the network. For example, a base station may be configured to accommodate the operation of neighboring base stations. Where the neighboring base station operates with TDD sectoring, frames of the two base stations can be synchronized to minimize interference between adjacent sectors covered by the base stations. Network configuration may be provided to the base station by a system operator and, in some embodiments, may be discovered by analyzing received signals for characteristics such as origin, strength and signal to noise ratios.

Figure 3:
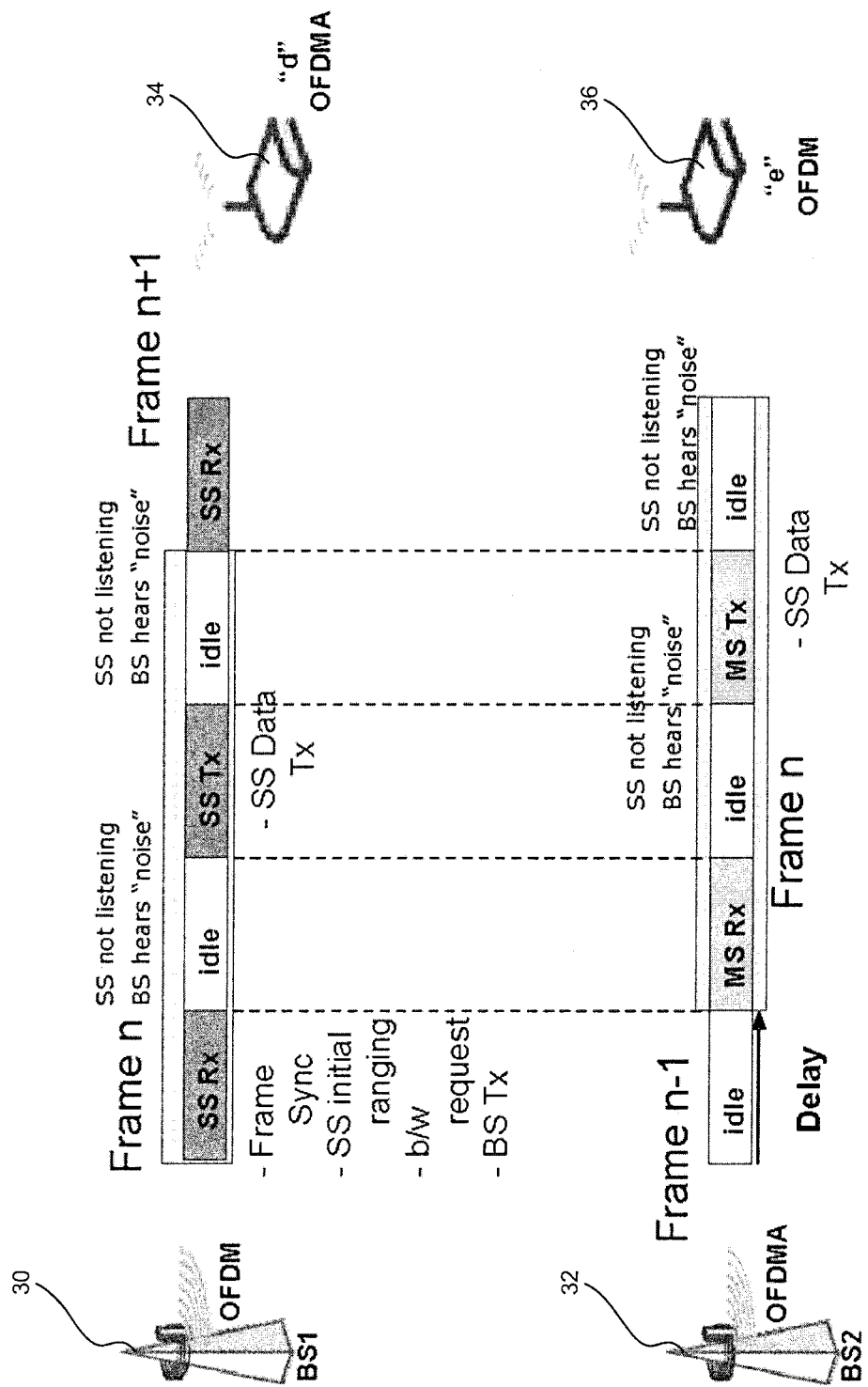
FIG. 3 depicts zone timing in an embodiment.

Certain embodiments, including those described above, can be used for deployment of OFDM and OFDMA IEEE 802.16 systems using the same frequency. As depicted in FIG. 3, an OFDM base station 30 can transmit messages to a subscriber station during the subscriber station 36 Rx time-zone. The OFDM base station 30 may next go into idle time (i.e. dead1, FIG. 2b) and can then receive signals transmitted by subscriber stations 36. The OFDM base station 30 may then go into idle time (i.e. dead2, FIG. 2b).

On the other time, OFDMA base station 32 may start with a delay during the frame corresponding to the down period of the OFDM base station 32. OFDMA base station 32 may transmit during a zone corresponding to an idle time of OFDM base station 30, and may go into an idle zone while OFDM base station 30 is receiving transmissions from subscriber stations 36. OFDMA base station 32 can receive subscriber station 34 transmissions while the OFDM base station 30 is in idle mode. Thus, this scheme allows OFDM and OFDMA systems to use the same frequency at the same time.

Figure 4:
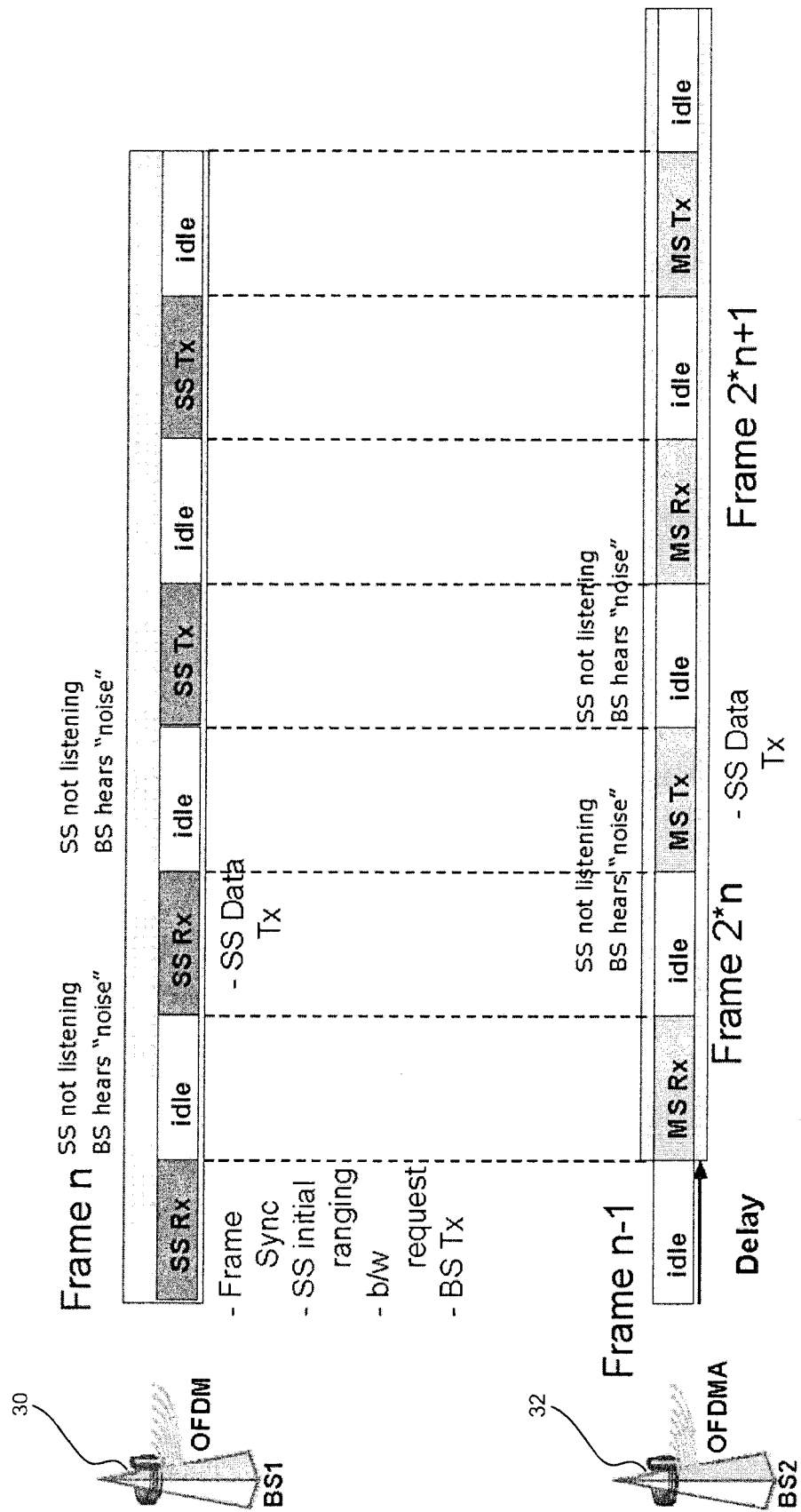
FIG. 4 depicts zone timing in an embodiment.

Other permutations of the scheme are possible and envisioned. For example, instead of both OFDM base station 30 and OFDMA base station 32 using the same framing interval, they may use multiples of the lowest framing interval. FIG. 4 depicts an example which includes a 5 msec OFDMA system and 10 msec OFDM system.

Figure 5:
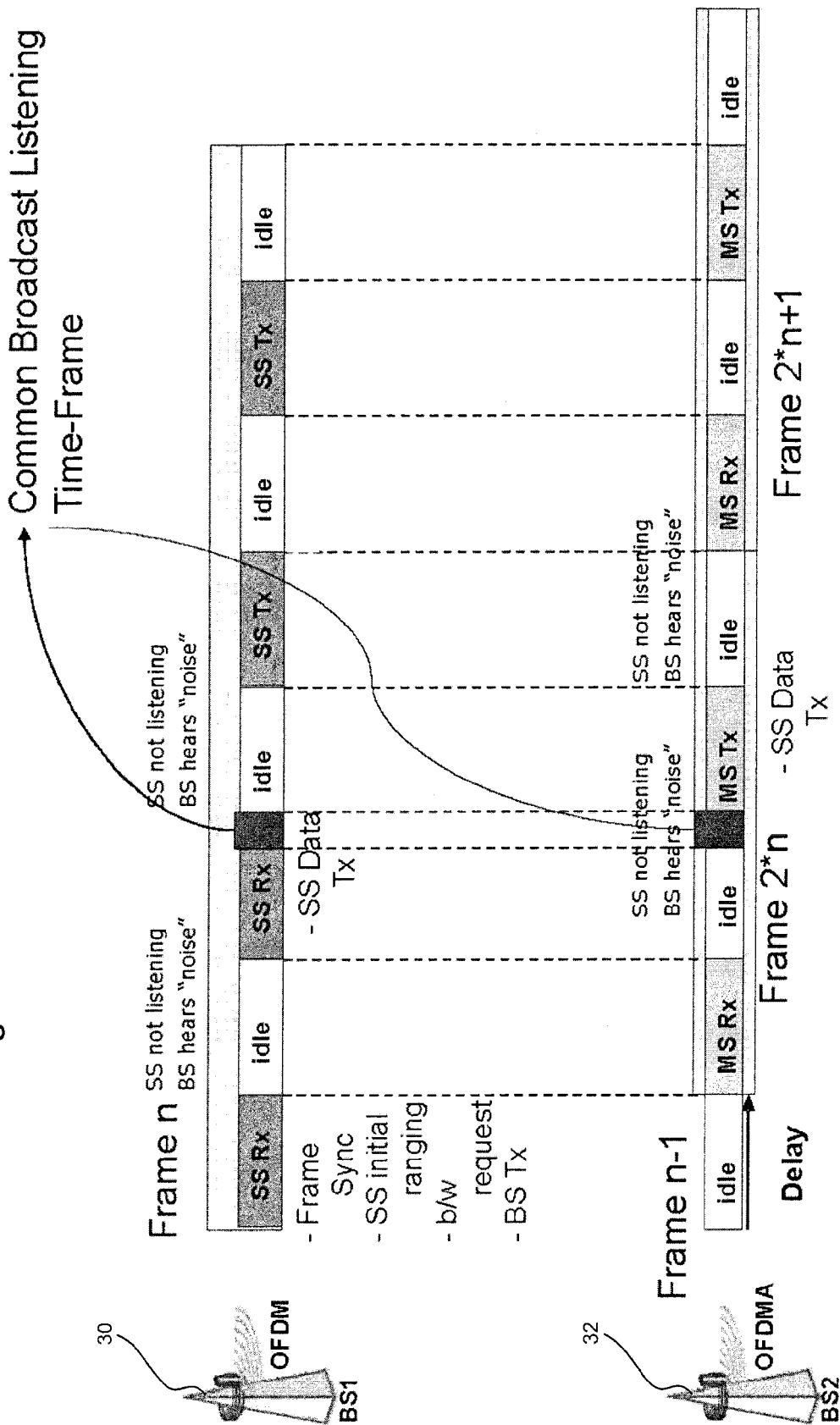
FIG. 5 depicts zone timing in an embodiment.

In certain embodiments, receiving areas that any SS/MS can transmit may be allocated as broadcast listening areas. An example of zone timing in an example of such embodiments is depicted in FIG. 5.

Certain embodiments may assign transmission and reception times such that both OFDM and OFDMA systems can transmit and receive at the same time knowing that the intended receivers can communicate even when multiple base stations are working at the same time.

Additional Descriptions of Certain Aspects of the Invention

Certain embodiments of the invention provide methods for controlling transmission in a wireless network, comprising providing a sequence of time zones, each time zone being allocated to one of a plurality of base stations, and for each of the plurality of base stations, selecting dead times in the sequence during which the each base station is prohibited from transmitting and receiving. In certain of these embodiments, the dead times for the each base station correspond to transmit or receive zones of at least one other base station. In certain of these embodiments, certain of the dead times are interleaved with transmit zones assigned to the each base station. In certain of these embodiments, certain of the dead times are interleaved with receive zones assigned to the each base station. In certain of these embodiments, the dead times are selected to reduce interference between the each base station and the at least one other base station.

In certain of these embodiments, the each base station and one or more of the at least one other base station support different wireless transmission systems. In certain of these embodiments, the different wireless transmission systems include OFDM systems. In certain of these embodiments, the different wireless transmission systems include OFDMA systems. In certain of these embodiments, each dead time overlaps an entire transmit time zone of the at least one other base station. In certain of these embodiments, each dead time overlaps an entire receive time zone of the at least one other base station.

Certain of these embodiments provide a wireless transmission system, comprising a plurality of wireless base stations, each base station in wireless communication with at least one subscriber station, and a sequencer configured to provide a sequence of time zones. In certain of these embodiments, each time zone is assigned to at least one of the base stations. In certain of these embodiments, the time zones include dead times during which communication between at least one base station and its corresponding subscriber stations is suppressed. In certain of these embodiments, the dead times are assigned to a selected base station to reduce interference between the selected base station and at least one other base station. In certain of these embodiments, the plurality of base stations include base stations that support different wireless transmission systems. In certain of these embodiments, the different wireless transmission systems include OFDM systems. In certain of these embodiments, the different wireless transmission systems include OFDMA systems. In certain of these embodiments, a dead time is assigned to a selected base station when one or more other base stations are transmitting. In certain of these embodiments, a dead time is assigned to a selected base station when one or more other base stations are receiving. In certain of these embodiments, a dead time is assigned to a selected base station when one or more other base stations are transmitting. In certain of these embodiments, a dead time is assigned to a selected base station when one or more other base stations are receiving.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
    scheduling a plurality of time zones for a first base station and a second base station;
    instructing the first base station to generate a first base station frame including a dead segment, the dead segment corresponding to a first time zone of the plurality of time zones;
    instructing the second base station to generate a second base station frame including a transmission segment, the transmission segment corresponding to the first time zone;
    instructing the first base station to transmit the first base station frame to a subscriber station during the first time zone; and
    instructing the second base station to transmit the second base station frame to the subscriber station during the first time zone;
    the first base station frame interfering less with the second base station frame than if the first base station frame included a second transmission segment instead of the dead segment.

2. The method of claim 1, wherein the transmission segment comprises an up segment for the second base station to schedule upstream traffic.

3. The method of claim 1, wherein the transmission segment comprises a down segment for the second base station to transmit downstream traffic.

4. The method of claim 1, further comprising facilitating transmission of the second base station frame from the second base station to the subscriber station.

5. The method of claim 1, wherein scheduling the plurality of time zones comprises scheduling, at the first base station, the plurality of time zones.

6. The method of claim 1, wherein scheduling the plurality of time zones comprises scheduling, at a scheduler external to the first base station and the second base station, the plurality of time zones.

7. The method of claim 1, wherein the first base station and the second base station are configured to transmit at a common frequency during the first time zone.

8. The method of claim 1, wherein the first base station supports a first wireless transmission system, and the second base station supports a second wireless transmission system.

9. The method of claim 8, wherein the first wireless transmission system comprises an Orthogonal Frequency Division Multiplexing (OFDM) system.

10. The method of claim 8, wherein the second wireless transmission system comprises an Orthogonal Frequency Division Multiple Access (OFDMA) system.

11. The method of claim 1, wherein the first base station and the second base station are configured to support IEEE 802.16 standards.

12. The method of claim 1, wherein:
the second base station frame comprises another dead segment corresponding to a second time zone of the plurality of time zones; and
the first base station frame comprises a third transmission segment corresponding to the second time zone.

13. A system comprising:
a scheduler configured to schedule a plurality of time zones for a first base station and a second base station; and
a sequencer configured to:
instruct the first base station to generate a first base station frame including a dead segment corresponding to a first time zone of the plurality of time zones;
instruct the second base station to generate a second base station frame including a transmission segment corresponding to the first time zone;
instruct the first base station to transmit the first base station frame to a subscriber station during the first time zone; and
instruct the second base station to transmit the second base station frame to the subscriber station during the first time zone, the first base station frame interfering less with the second base station frame than if the first base station frame included a second transmission segment instead of the dead segment.

14. The system of claim 13, wherein one or more of the scheduler and the sequencer is incorporated into the first base station.

15. The system of claim 13, wherein the scheduler is external to the first base station and the second base station.

16. The system of claim 13, wherein the first base station supports a first wireless transmission system, and the second base station supports a second wireless transmission system.

17. The system of claim 16, wherein the first wireless transmission system comprises an Orthogonal Frequency Division Multiplexing (OFDM) system, or the second wireless transmission system comprises an Orthogonal Frequency Division Multiple Access (OFDMA) system.

18. The system of claim 13, wherein the first base station and the second base station are configured to support IEEE 802.16 standards.

19. The system of claim 13, wherein:
the second base station frame comprises another dead segment corresponding to a second time zone of the plurality of time zones; and
the first base station frame comprises a third transmission segment corresponding to the second time zone.

* * * * *